United States Patent
Sanches

(10) Patent No.: US 6,189,075 B1
(45) Date of Patent: *Feb. 13, 2001

(54) CIRCUIT FOR THE MANAGEMENT OF MEMORIES IN A MULTIPLE-USER ENVIRONMENT WITH ACCESS REQUEST AND PRIORITY

(75) Inventor: Josè Sanches, Meylan (FR)

(73) Assignee: SGS-Thomson Microelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/014,239

(22) Filed: Jan. 27, 1998

(30) Foreign Application Priority Data

Feb. 5, 1997 (FR) .................................................... 9701455

(51) Int. Cl.[7] ....................................................... G06F 12/00
(52) U.S. Cl. ............................ 711/141; 711/138; 711/158; 710/53
(58) Field of Search ..................................... 711/122, 147, 711/158, 130, 141, 144, 138; 710/53

(56) References Cited

U.S. PATENT DOCUMENTS

| 4,212,057 | * | 7/1980 | Devlin et al. | 711/151 |
|---|---|---|---|---|
| 5,276,849 | * | 1/1994 | Patel | 711/141 |
| 5,283,886 | * | 2/1994 | Nishii et al. | 711/144 |
| 5,363,486 | | 11/1994 | Olson et al. . | |
| 5,530,933 | * | 6/1996 | Frink et al. | 711/141 |
| 5,590,304 | | 12/1996 | Adkisson . | |
| 5,796,413 | * | 8/1998 | Shipp et al. | 345/522 |

FOREIGN PATENT DOCUMENTS

| 2 288 256 | 10/1995 | (GB) | G06F/12/02 |
|---|---|---|---|
| 86/03608 | 6/1986 | (WO) | G06F/13/16 |

* cited by examiner

Primary Examiner—Do Hyun Yoo
Assistant Examiner—Nasser Moazzami
(74) Attorney, Agent, or Firm—Theodore E. Galanthay; Allen, Dyer, Doppelt, Milbrath & Gilchrist, P.A.

(57) ABSTRACT

A multiple-user processing system exchanges data elements with a central memory by a request system managed by a management circuit. The system furthermore has available a buffer memory to regulate the flow of information from the central memory.

15 Claims, 2 Drawing Sheets

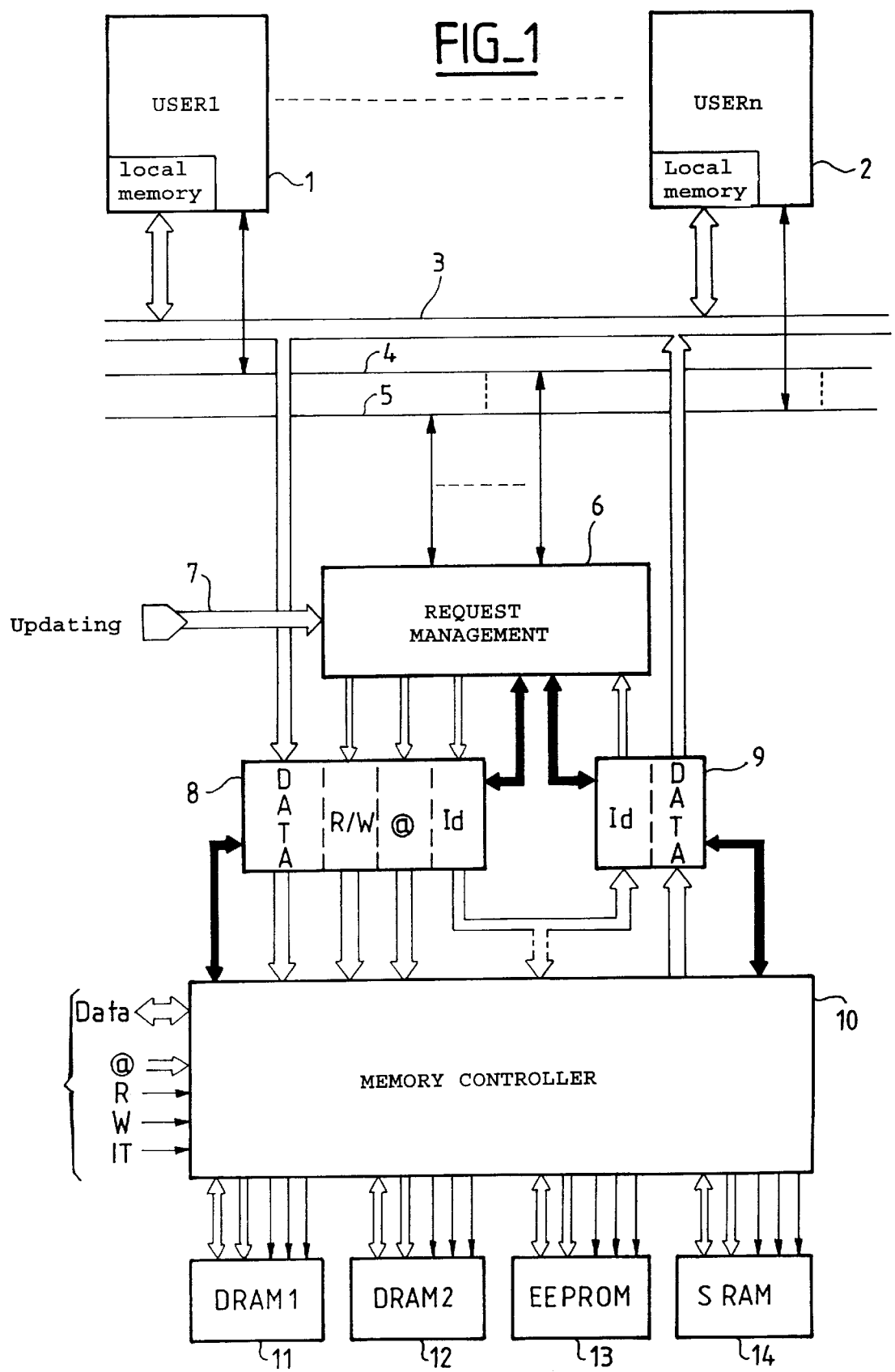

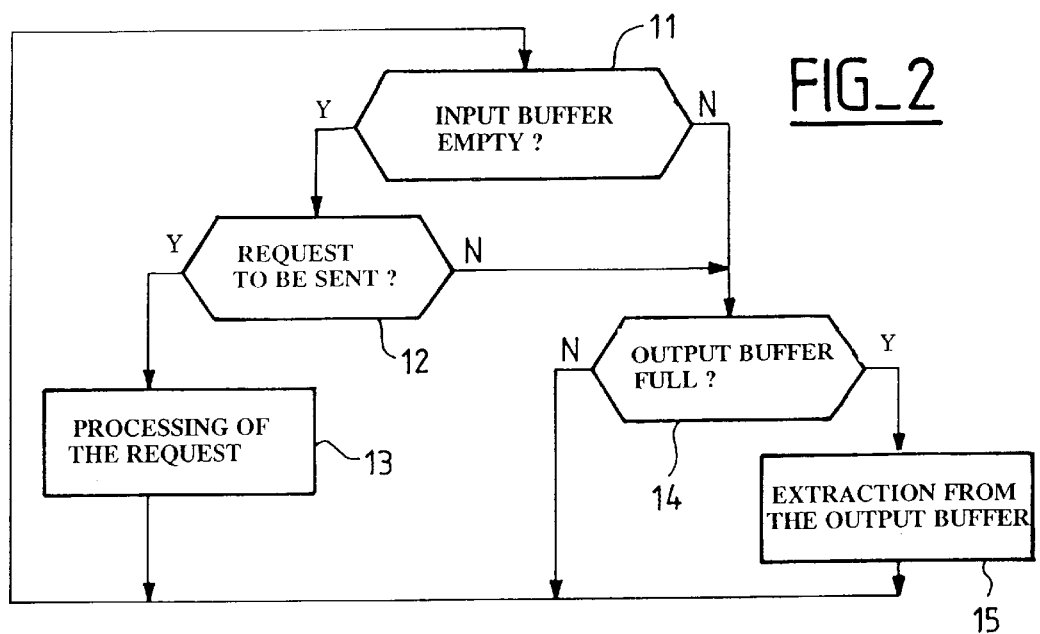
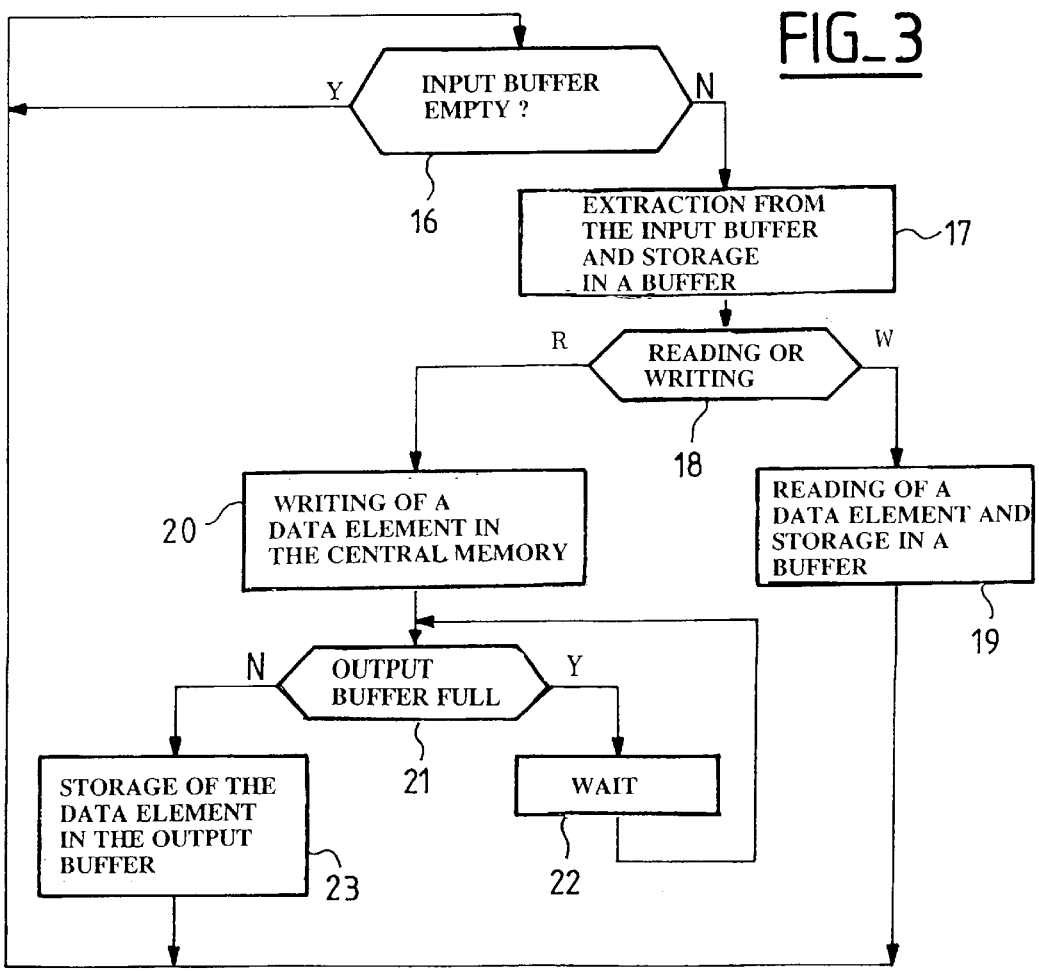

CIRCUIT FOR THE MANAGEMENT OF MEMORIES IN A MULTIPLE-USER ENVIRONMENT WITH ACCESS REQUEST AND PRIORITY

FIELD OF THE INVENTION

The invention relates to memory circuits, and, more particularly, to a circuit for the control of memory in a multiple-user environment with access request and access priority. This type of circuit is used in multiprocessor applications each possessing a local working memory. The applications relating to image processing often have recourse to this type of system, with the image processing operations being generally done by blocks that may be processed separately.

BACKGROUND OF THE INVENTION

In multiprocessor environments, it is possible to have a memory that is directly accessible by all the processors. However, the arbitration of access is relatively difficult to manage when a large number of processors are used. One approach currently being developed includes the association, with each processor or group of processors, of a small-sized memory (of some kilobytes) that is used as a local working memory. The local working memory contains a copy of a part of the total memory of the system. Furthermore, so that the processors may make the most efficient use of their computation capacities, memory management circuits are used to which the processors address simple requests.

The requests are used to simplify the wiring of the multiprocessor systems. One wire may be enough if the request is only a request for the exchange of information elements between the central memory and the local memory. The request for the exchange of information is managed entirely by a memory management circuit which, as a function of parameters corresponding to the processor that performs a request, will determine the direction of the transfer to be made, and the size of the block to be transferred, its position in the central memory and possible authorization of access in write and/or read mode. The memory management circuit and the processors then exchange the data elements in a synchronized manner, significantly reducing the number of wires to manage the exchange.

In a system of this kind, when one request is being processed, no other request can be taken into account before the end of the request. A priority processor may, however, be authorized to interrupt the request in progress for priority needs. In the event of interruption of the request, there occurs a desynchronization of the user devices with respect to the data exchange. The desynchronization makes the exchanged data elements erroneous and requires the exchange to be redone. Now, to carry a new exchange, it is necessary to make a new request which may go through after other requests.

In such a system, the local memories are generally small and very fast, and a central memory is generally very large and fairly slow. Since the use of elementary requests makes it necessary to carry out transfers of synchronized data elements, it causes a stopping of the user devices during the exchange of data elements with the central memory. Furthermore, the data transfer must be done at the speed of the slowest memory. Each user device is, therefore, slowed down by the central memory.

SUMMARY OF THE INVENTION

It is an object of the invention to propose an approach that reduces the possibilities of desynchronization of the transfer of data for the user devices. Another aim of the invention is to make the user devices function at an optimum speed. To do so, in the invention, a first-in/first-out (FIFO) type of buffer circuit is used. One improvement includes totally eliminating the possibility of desynchronization by permitting transfers only if the FIFO buffer memory is full enough or empty enough to perform the transfer without any risk of an interruption of the transfer.

The present invention is directed to an information processing system. The system preferably comprises:

at least two user devices each having one local memory, the local memory being used as a working memory for each of the user devices;

at least one priority access processor;

a central memory whose contents can be used by one of the at least two user devices mentioned above as well as by the at least one processor mentioned above;

a circuit for the management of the central memory that receives requests from user devices and, as a function of the request and of internal information, gives signals to drive the memory and the data exchanges between the memory and the user devices;

a FIFO type buffer memory connected firstly between the management circuit and the central memory and secondly between the user devices and the central memory; and means for substituting that enables the processor to replace the buffer memory to directly drive the central memory.

Another aspect of the invention is directed to a method for the management of a central memory shared between at least two user devices each having available one local memory by means of a request management circuit to manage the data exchanges between the local memories and the central memory and at least one priority access processor. The method preferably includes steps such that:

the requests sent by the user devices are requests for data exchange that are interpreted by the request management circuit to produce control signals to drive the memory during an exchange of data between the memory and one of the user devices;

the control signals are stored in a FIFO type buffer memory that regulates the bit rate of the control signals between the request management circuit and the memory; and the processor replaces the buffer memory in order to drive the central memory.

BRIEF DESCRIPTION OF THE DRAWINGS

The invention will be understood more clearly and other advantages shall appear from the following description of a particular embodiment made with reference to the appended drawings, of which:

FIG. 1 shows a multiple-user system using a central memory according to the invention, FIGS. 2 and 3 show operating flow charts in accordance with the invention.

DETAILED DESCRIPTION OF THE PREFERRED EMBODIMENTS

The system of FIG. 1 is a multi-user system having a plurality of user devices 1 and 2 each comprising processing units (not shown) using the small-sized local memory, for example, a 512-byte memory. Each of the user devices 1 and 2 is connected to a central data bus 3 to enable the exchange of data elements with the rest of the system. Each of the user devices 1 and 2 is respectively connected to a request line 4 or 5 to inform the system that it is seeking to make an exchange and also that the system may inform it that it will receive or send data elements.

Furthermore, the system also has a request management circuit 6 possessing request inputs/outputs connected to each of the request lines 4 and 5. The management circuit 6 has an input connected to an updating bus 7, a control output, an address output, an identifier output, an identifier input and first and second control inputs/outputs. The management circuit 6 is used to manage the data exchanges between the different user devices 1 and 2 and the rest of the system.

In the present example, when a user device 1 or 2 seeks to make an exchange of data, it will send a pulse on the request line 4 or 5 that is associated with it. The management circuit 6 will memorize this request. Then, when it is the time to process the request, the management circuit 6 will consult a table indicating what the request includes. As a function of the information elements contained in the table, the management circuit will then generate a sequence of addresses corresponding to addresses in a central memory of the system, at its address output, and will generate the different read/write commands at its control output. If it is a write operation, the management circuit will tell the concerned user device 1 or 2, by the dispatching of the pulse on the request line 4 or 5 that is associated with it, to send the data to be written in the central memory in a synchronous manner. Then the table of the management circuit 6 is updated. If it is a read operation, the management circuit will also give an identifier on its identification output representing the user device 1 or 2 that has made the request. Furthermore, when the management circuit 6 receives an identifier at its identifier input, the management circuit 6, if necessary, sends a pulse on the request line 4 or 5 corresponding to the user device 1 or 2 designated by the identifier.

The management circuit table is used to obtain knowledge of the contents of the request. The table may be provided by a small-sized memory that is initialized at the beginning of the operation by a management processor of the system by means of the updating bus 7. The table is then updated by the management circuit 6 during operation. However, during operation, it is also possible for the table to be updated by the management processor of the system.

In the present example, the table comprises access lines corresponding to each of the user devices 1 or 2. Each line has an address indicator, for example on 20 bits, a block size item, for example on 4 bits, the operation to be performed during the data transfer (reading or writing), for example, on 1 bit, a value of address incrementation in the block, for example, on 8 bits, a next instruction command, for example, on 12 bits. A first group of information elements (address pointer, block size, incrementation in the block and the operation to be performed) is used to generate the addresses and commands of the requests being processed. A second group of information elements (block incrementation and next instruction command) is used to update the table for the next request. The next instruction command is encoded in the present example on 12 bits and makes it possible, for example, to define the different sequences of addresses and instructions between the different requests.

A first-in/first-out (FIFO) type input buffer 8 has four data inputs, four data outputs, one input control input/output and one output control input/output. A first of the data inputs is connected to the data bus 3 to receive a data word, for example, a 32-bit word. A second of these inputs is connected to the control output of the management circuit 6 to receive, for example, a bit indicating that it is a read operation or a write operation in a central memory. A third input is connected to the address output of the management circuit 6 to receive an address, for example, on 20 bits. A fourth input is connected to the identifying output of the management circuit 6 to receive an identifier, for example, on 6 bits. In the present example, the input buffer 8 is FIFO buffer with two data inputs that is actually equivalent to a FIFO buffer having 59 input bits subdivided into four groups (similarly for the outputs). Furthermore, the input control input/output is connected to the first control input/output of the management circuit 6. The input control input/output gives a signal indicating that the FIFO is empty and receives a data input signal in the FIFO.

A first-in/first-out (FIFO) type output buffer 9 has two data inputs, two data outputs, one input control input/output and one output control input/output. A first of the outputs is connected to the identifying input of the management circuit 6 to give an identifier, for example, on 6 bits. A second of the data outputs is connected to the data bus 3 to give a data word, for example, on 32 bits. A first of the inputs is connected to a fourth of the input buffer outputs 8 to receive an identifier. In the present example, the output buffer 8 is a data two-input FIFO that is actually equivalent to a FIFO having 38 input bits distributed between two groups, as in the case of the outputs. Furthermore, the output control input/output is connected to the second control input/output of the management circuit 6. The output control input/output gives a signal indicating that the FIFO is full and receives a data output signal from the FIFO.

A memory controller circuit 10 is used as an access to the central processing memory. This controller circuit 10 has three input/output groups: a first priority input/output group connected to a priority access processor, a second input/output group of users connected to the input buffers and output buffers 8 and 9, and a third memory input/output group connected to different types of memory circuits 11 to 14. The first group of inputs/outputs comprises a data input/output, an address input, read and write control inputs, and an interruption input. In the first group of inputs/outputs, those skilled in the art will notice that they are essentially inputs/outputs that are conventionally used between the processor and the memory except for the interruption input which is an input used to indicate that the priority processor, for example, the processor for the total management of the system, takes direct control of the central memory. The second group of inputs/outputs comprises a data input connected to a first data output of the input buffer 8, a control input connected to a second output of the data outputs of the control buffer 8, an address input connected to a third output of the data outputs of the input buffer 8, a data output connected to a second input of the data inputs of the output buffer 9, a first control input/output connected to the output control input/output of the input buffer 8, and a second control input/output connected to the input control input/output of the output buffer 9. The third group has data inputs/outputs, address outputs and different control and selection outputs that may exist in certain types of memory as is known to those skilled in the art.

The controller circuit 10 has three functions: the first function is to interface the input buffers and output buffers 8 and 9 so as to enable exchange with the central memory; the second function is to serve for routing between the priority processor and the input and output buffer circuits 8 and 9, the interruption input playing the role of a routing control substituting or not substituting the priority processor for the user devices 1 and 2; and the third function is the current function of the memory controllers, namely the adapting of the different memory circuits 11 to 14 to form a single homogenous central memory by creating certain specific signals for certain types of memory, for example, the BURST mode for high capacity memories. The controller 10 provided with the different memory circuits 11 to 14 forms the central processing memory of the system.

The second function of the controller circuit 10 is specific to the invention. Indeed, the data elements, addresses and commands received from the input buffer 8 or the data elements sent to the output buffer 9 are standard signals for a memory, but the extraction of these signals from a FIFO memory is not a standard process. To enable the performance of the data exchanges with the input buffer 8, the controller circuit 10 receives, at its first control input/output, a signal indicating that the input buffer 8 is not empty and also gives a signal indicating simultaneous extraction on all the outputs of the input buffer 8. Furthermore, the second control input/output of the controller circuit 10 receives a signal indicating that the output buffer 9 is not full and gives a signal indicating simultaneous input at the data inputs of the output buffer 9.

The working of the input and output buffers 8 and 9 will be understood more clearly from FIGS. 2 and 3, given by way of a non-restrictive example respectively representing the flow charts of operation of the management circuit 6 and controller circuit 10. In FIG. 2, the first control alternative 11 ascertains that the input buffer 8 is empty. This first alternative 11 is obtained in the management circuit 6 by consultation with the information coming from the first buffer 8. If the input buffer 8 is empty, then a second alternative 12 is reached. This second alternative 12 is done in the management circuit 6 which will consult internal flip-flop circuits having stored the fact that the user devices 1 and 2 may have made requests that are not yet processed. If there are actually requests to be processed, then a first stage 13 is performed corresponding to the processing of the request.

The processing of the request will be done as explained already in part, namely: generation by the management circuit 6 on different address outputs and control signals and, possibly, depending on whether it is a reading operation or a writing operation, a synchronization signal for the dispatch of data to one of the user devices 1 or 2 or an identifier. After the generation of each address, done at the same speed as the arrival of the data elements from a user device 1 or 2 if necessary, a signal is sent to the input buffer so as to bring about the entry of the data, addresses, commands and identifiers. The operation is repeated up to the end of the request defined by means of the size of the block to be transferred. Those skilled in the art will note that it is necessary that the input buffer should enable the storage of at least one full request of maximum size. In the present example, the minimum size of the input buffer is 16 words of 59 bits. Once the first step 13 has been processed, the first alternative 11 is returned to.

Should the first alternative 11 reach an input buffer that is not empty, or should the second alternative end in a situation where no request is sent, then we are led to the third alternative 14. This third alternative 14 includes ascertaining that the output buffer 9 is full. If the output buffer is full, then a second step 15 is performed corresponding to an extraction of the data elements present in the output buffer 9 in synchronizing the user device 1 or 2 corresponding to the identifier present in the output buffer 9. The extraction lasts until the block comes out of the output buffer 9. Once the second step 15 is processed, there is a return to the first alternative 11. Furthermore, if the result of the third alternative 14 is that the output buffer 9 is not full, then there is also a return to the first alternative 11.

As described, the input and output buffers 8 and 9 form a buffer memory with which the user devices 1 and 2 may exchange data elements without any risk of being interrupted by the priority processor. Those skilled in the art will easily understand that if the operation uses input and output buffers 8 and 9 capable at most of containing only one request, then there will be an idle time during each read request. Indeed, in this case the management circuit 6 will send the request containing a succession of reading operations into the input buffer and will be incapable of sending other requests so long as the request has not been entirely processed. Furthermore, the extraction cannot be done so long as the request has not been entirely processed. To avoid these idle times, it is sufficient to use an input buffer having a size greater than the size of the maximum block and, indicate whether the input buffer is empty enough to receive a full request. A request is processed only if the buffer memory is sufficiently empty to be capable of receiving the totality of the request. The same thing may also be done on the output buffer 9. In this case, it will be indicated that the output buffer 9 is full enough. In this way, any data transfer between the memory and one of the user devices 1 and 2 takes place only if the buffer memory is full enough or empty enough for the totality of the request corresponding to the data transfer to be processed. Preferably, use is made of the input and output buffers 8 and 9 having a capacity corresponding to two requests for maximum-sized block transfers.

The flow chart of FIG. 3 made according to the controller circuit 10 runs as long as the interruption signal allows it. If ever the interruption signal should become active, then the performance of this flow chart stops and resumes at the place where this flow chart has stopped. Those skilled in the art could carry out such a function for example by masking the clock signal that sequences this algorithm.

A fourth alternative 16 is achieved in the controller circuit 10. This fourth alternative 16 includes verifying that the input buffer 8 is vacant. If the input buffer is empty, then nothing is done and a loop is made on the fourth alternative 16. If the input buffer 18 is not empty, then the third step 17 is performed. The third step 17 includes the extraction, from the input buffer 8, of the information elements contained therein and their storage in a buffer, for example, a register. Then, the fifth alternative 18 is performed. This fifth alternative 18 is used to ascertain that the command to be made is a read or write command. If it is a write command, then the fourth step 19 is performed, and if it is a read command then the fifth step 20 is performed. The fourth step 19 includes the writing of the data element present in the buffer at the address indicated in the buffer. Once the fourth step 19 is ended, a loop is made on the fourth alternative 16. The fifth step 20 includes the reading of the data element at the address indicated in the buffer and the storage of the data element read in the buffer.

After this fifth step 20, there comes a sixth alternative 21. The sixth alternative 21 includes testing if the output buffer 9 is full. If the output buffer 9 is full, then the controller circuit 10 waits for a short period during a sixth step 22 and again performs the sixth alternative 21. If the output buffer 9 is not full, then the seventh step 23 is performed. The seventh step 23 includes the storage, in the output buffer 9, of the data element present in the buffer. At the end of the seventh step 23, there is a looping to the fourth alternative 16.

Those skilled in the art will observe that it is not necessary to take account of the size of the requests for access to the buffer memory on the controller circuit 10 side. The access times of the user devices 1 and 2 and of the central memory are completely disassociated. This has the additional effect of optimizing the access to the central memory. Indeed, since the central memory is slower than the user devices 1 and 2, the cases of memory access are more spread out in time than the data transfers with the user devices. However, those skilled in the art should see to it that the requests can be sent by the user devices 1 and 2 when there is no risk that the user device will lack the transfer data.

Many variants and improvements may be made without changing the object of the invention. It is possible to use FIFO memories having several content indicators so as to know, for example, if it is possible to carry out requests and transfers that are not necessarily of a maximum transfer size. The effect is that of optimizing the algorithm of FIG. 2 so that it acts at higher speed to respond to reading operations on blocks with a size smaller than the maximum size.

It is also possible to have available an additional input on the controller circuit 10 to receive the identifier corresponding to the user device 1 or 2 which has made the request. This makes it possible to make a display, in a table, of the blocks of the central memory that are being used and of the user in question.

In the example described, use is made of request lines 4 and 5 corresponding to each user device 1 and 2. An additional value of the circuit lies in the possibility of using these lines to transmit transfer synchronization signals, such as a clock, while at the same time making it possible to receive other requests on the other wires.

One variant for the request lines 4 and 5 includes using a request bus when there is a large number of user devices 1 and 2. The request bus must take into account possible conflicts between the different user devices 1 and 2 and the management circuit 6.

The taking of a decision that makes it possible to state which request must pass before another has not been dealt with. Several possibilities of processing algorithms are possible. Another possibility is, for example, the use of a priority encoder as described in the application EP-A-0 640 926.

The system described is particularly suited to the processing of images. Indeed, the digital processing of the images often uses a subdivision into blocks corresponding to squares of 8×8 or 16×16 pixels. One request may be used to read the image block in the central memory block line by block line, while the processor of the user device will start computations on the basis of the previously recorded block line. A valuable feature lies in the use of the sliding filter for the addition of contrast or the elimination of noise.

The invention described corresponds to a preferred embodiment of the invention which completely resolves the problem of desynchronization raised in the introduction to the present application. However, a first goal of the invention includes reducing the risks of desynchronization. Indeed, if a buffer memory comprising either single input buffer 8 or a single output buffer 9 is used, then the risks of desynchronization are reduced by two. This does meet the first goal of the invention. This first goal is also fulfilled if the buffer memory is not tested.

Naturally, the indications on the sizes of data words, addresses, blocks, as well as the totality of the numerical indications may be changed as a function of the requirements of those skilled in the art without changing the invention in its substance. Furthermore, in the description and the drawings, the system has only two user devices 1 and 2. Those skilled in the art will understand that this is so solely to simplify the description and that such a system may use any number of user devices. Similarly, in the description, there is also a question of a priority processor which may also be a processor used for the comprehensive management of the system. It is clear that this priority processor can be formed by several processors that appear to the controller 10 as a single processor.

That which is claimed:

1. An information processing system comprising:
   at least two user devices each comprising one local memory, the local memory being used as a working memory for each of the user devices;
   at least one priority access processor generating a priority interrupt request for interrupting requests from the user devices;
   a central memory whose contents can be used by one of the at least two user devices and the at least one priority access processor;
   a circuit for managing the central memory that receives requests from the user devices and, as a function of the priority interrupt request and of internal information, gives signals to drive the central memory and data exchanges between the central memory and the user devices;
   a first-in/first-out (FIFO) buffer memory connected firstly between the management circuit and the central memory and secondly between the user devices and the central memory; and
   the circuit for managing the central memory enabling the priority access processor to replace the FIFO buffer memory to directly drive the central memory.

2. An information processing system according to claim 1, wherein the central memory comprises a memory controller and a plurality of memories; and wherein the controller produces signals for each of the memories and decodes a memory plane.

3. An information processing system according to claim 1, wherein the FIFO buffer memory comprises at least one input buffer whose data outputs are connected to the central memory.

4. An information processing system according to claim 3, wherein the input buffer memorizes:
   a memory address;
   an operation to be performed in the central memory; and
   a data element to be written if necessary.

5. An information processing system according to claim 3, wherein the input buffer memorizes an identifier of the user devices for which an operation in the central memory is performed.

6. An information processing system according to claims 1, wherein the FIFO buffer memory comprises at least one output buffer whose data inputs are connected to the central memory.

7. An information processing system according to claim 6, wherein the output buffer memorizes data element read and an identifier of the user devices which must receive the data element read.

8. An information processing system comprising:
   at least two user devices each comprising one local memory, the local memory being used as a working memory for each of the user devices;

at least one priority access processor generating a priority interrupt request for interrupting requests from the user devices;

a central memory whose contents can be used by one of the at least two user devices and the at least one priority access processor;

a circuit for managing the central memory that receives requests from the user devices and, as a function of the priority interrupt request and of internal information, gives signals to drive the central memory and data exchanges between the central memory and the user devices;

a first-in/first-out (FIFO) buffer memory connected firstly between the management circuit and the central memory and secondly between the user devices and the central memory, the FIFO buffer memory comprising
- at least one input buffer whose data outputs are connected to the central memory, and
- at least one output buffer whose data inputs are connected to the central memory; and the circuit for managing the central memory enabling the priority access processor to replace the FIFO buffer memory to directly drive the central memory.

9. An information processing system according to claim 8, wherein the central memory comprises a memory controller and a plurality of memories; and wherein the controller produces signals for each of the memories and decodes a memory plane.

10. An information processing system according to claim 8, wherein the input buffer memorizes:
- a memory address;
- an operation to be performed in the central memory; and
- a data element to be written if necessary.

11. An information processing system according to claim 8, wherein the input buffer memorizes an identifier of the user devices for which an operation in the central memory is performed.

12. An information processing system according to claim 8, wherein the output buffer memorizes the data element read and an identifier of the user devices which must receive data element read.

13. A method for managing a central memory shared between at least two user devices, each having available one local memory by means of a request management circuit to manage data exchanges between the local memories and the central memory and at least one priority access processor generating a priority interrupt request for interrupting requests from the user devices, the method comprising the steps of:

using the request management circuit for interpreting requests sent by the user devices for data exchange and for producing control signals to drive the central memory during an exchange of data between the central memory and one of the user devices;

storing the control signals in a first-in/first-out (FIFO) buffer memory that regulates a bit rate of the control signals between the request management circuit and the central memory; and using the priority access processor to replace the buffer memory to drive the central memory.

14. A method according to claim 13, wherein a request is processed only if the buffer memory is sufficiently empty to be capable of receiving the totality of commands of the request.

15. A method according to claim 13, wherein any transfer of data elements between the buffer memory and one of the user devices takes place only if the buffer memory is full enough or empty enough for a totality of the request corresponding to the data transfer to be processed.

* * * * *